United States Patent [19]

Hunter et al.

[11] Patent Number: 4,570,507
[45] Date of Patent: Feb. 18, 1986

[54] MAGNETIC FLUID GYRO BEARING AND CAGING MECHANISM

[75] Inventors: Joe S. Hunter; Lawrence J. Little, both of Huntsville, Ala.

[73] Assignee: The United States of America as represented by the Secretary of the Army, Washington, D.C.

[21] Appl. No.: 524,614

[22] Filed: Aug. 19, 1983

[51] Int. Cl.[4] ............... G01C 19/08; G01C 19/20; G01C 19/24; G01C 19/26

[52] U.S. Cl. ........................... 74/5.12; 74/5.1; 74/5.7

[58] Field of Search ............... 74/5.12, 5.1, 5.7, 5 R; 308/10; 384/107, 108

[56] References Cited

U.S. PATENT DOCUMENTS

| 3,746,407 | 7/1973 | Stiles et al. | 308/10 X |
| 3,913,870 | 10/1975 | Bolick | 74/5.12 X |
| 4,441,375 | 4/1984 | Minohara et al. | 74/5 R X |

FOREIGN PATENT DOCUMENTS

| 104214 | 8/1981 | Japan | 74/5 R |
| 104215 | 8/1981 | Japan | 74/5 R |

OTHER PUBLICATIONS

Dr. Ronald Moskowitz, "Magnetic Liquids", Engineering Materials & Design, Dec. 1973, pp. 17–22.

*Primary Examiner*—Rodney H. Bonck
*Attorney, Agent, or Firm*—Anthony T. Lane; Robert P. Gibson; James T. Deaton

[57] ABSTRACT

A gyro bearing and caging mechanism in which a spherical gyro rotor is driven by an induction motor with bearing surfaces between the rotor and stator having a magnetic fluid that is held in place at discrete positions around the circumference of the rotor by permanent magnets imbedded in the spherical rotor and a movable caging plate with magnets in a surface thereof and magnetic fluid between surfaces of the caging plate and a top surface of the rotor for caging the rotor.

2 Claims, 3 Drawing Figures

4,570,507

MAGNETIC FLUID GYRO BEARING AND CAGING MECHANISM

DEDICATORY CLAUSE

The invention described herein may be manufactured, used, and licensed by or for the Government for governmental purposes without the payment to us of any royalties thereon.

BACKGROUND OF THE INVENTION

The function of gyro spin bearings is to provide a stable and rigid axis of rotation for the gyro rotor with low friction and adequate life. Bearings must be stable in order to reduce mass shifts, and they should be rigid and have the proper elastic ratios in order to minimize compliance effects. They should have a low friction torque in order to reduce to a minimum the weight of the motor and the effects of temperature gradients due to the power input, and they must have a life adequate for the particular application.

Induction motors and synchronous hysteresis motors have been used in the past to spin the gyro rotor. However, in these devices there is a need for a bearing means that lends itself to this type construction and that does not produce temperature gradients that are undesirable, and a bearing that has low friction torque. Also, there is a need for a caging mechanism that has low friction means also.

Therefore, it is an object of this invention to provide a rotor and stator in which one of these members has the motor windings mounted therein and the other member has magnets thereon with magnetic fluid between the two surfaces to act as a bearing.

Another object of this invention is to provide a bearing between the rotor and its caging member and a bearing such as a magnetic fluid so as to virtually eliminate kick during uncaging of the rotor.

Other objects and advantages of this invention will be obvious to those skilled in this art.

SUMMARY OF THE INVENTION

In accordance with this invention, a gyro is provided which has a bearing means between the rotor and stator provided by magnetic fluid and a caging means which also includes a magnetic fluid provided between the rotor and caging plate. The gyro of this invention includes a stator with motor windings mounted therein and presenting a concave type spherical surface and a spherical rotor is mounted inside the stator with permanent magnets embedded and mounted about the circumference of the rotor with magnetic fluid between the rotor and stator spherical surfaces and being held by the permanent magnets to provide a good fluid bearing between these spherical surfaces. Also, a flat caging plate has permanent magnets imbedded therein and mounted at one end of the rotor with magnetic fluid being held by the permanent magnets to provide a good fluid bearing between these surfaces and provide a caging mechanism that can be removed from the rotor to substantially and virtually eliminate uncaging kick as the caging plate is removed from the rotor.

DESCRIPTION OF THE PREFERRED EMBODIMENT

Figure 1:
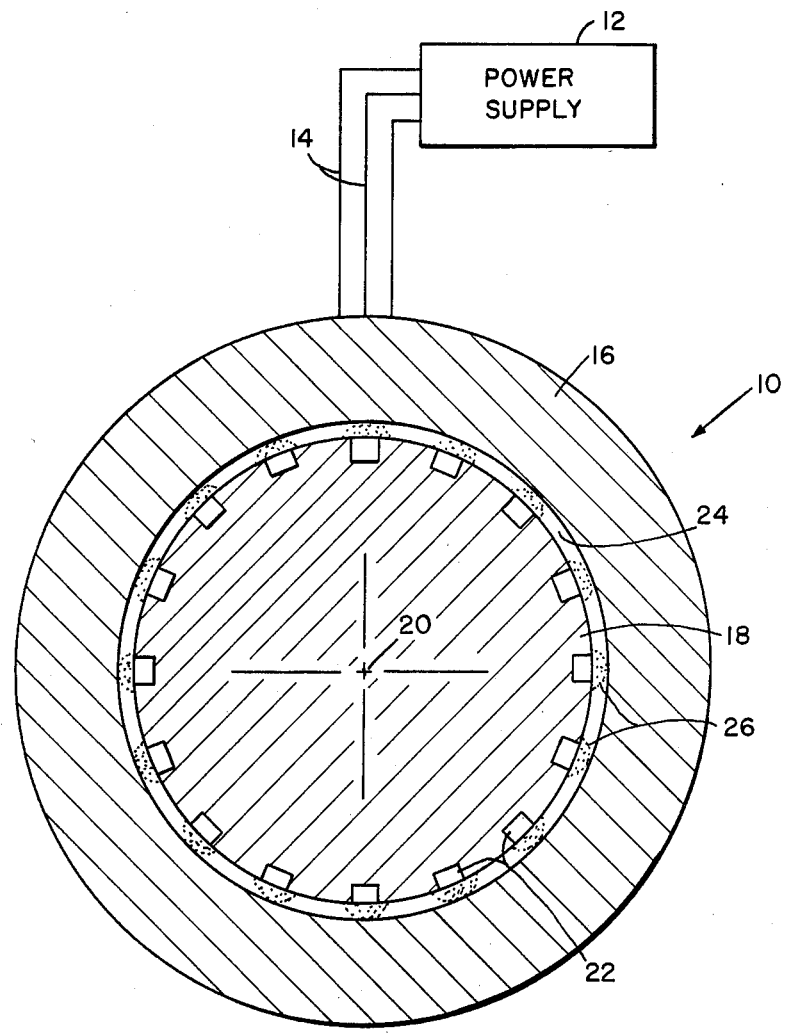
FIG. 1 is a schematic view particially in section illustrating a rotor and stator separated by a thin magnetic fluid bearing.
Figure 2:
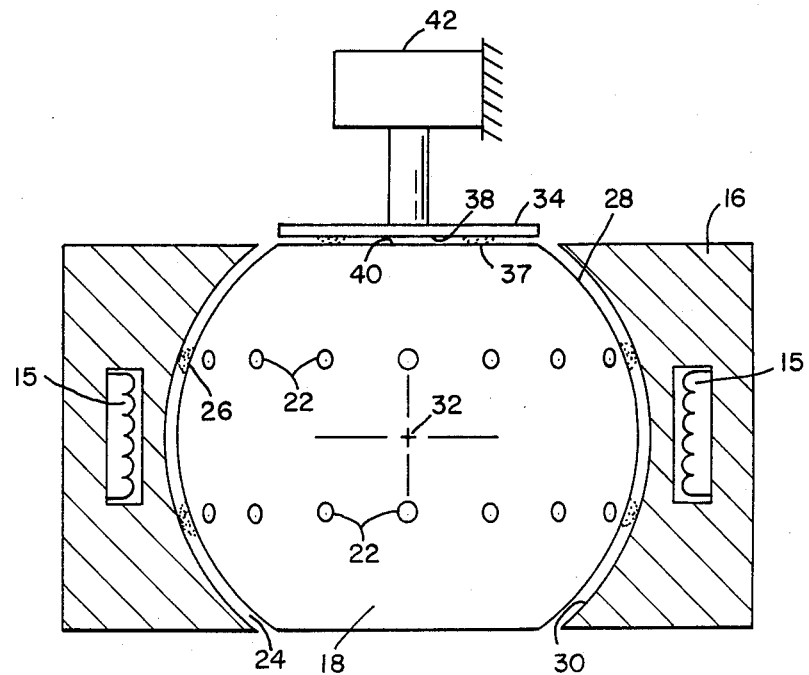
FIG. 2 is a view partially in section illustrating the permanent magnets in the rotor and the caging plate for the rotor.

Referring now to the drawing, the magnetic fluid gyro bearing and caging mechanism 10 includes a 3-phase power supply 12 that is connected by leads 14 to windings 15 (see FIG. 2) in stator structure 16 which is used to bring rotor 18 up to speed about spin axis 20. Permanent magnets 22 mounted about the circumference of rotor 18 serve as the armature for the motor. A gap 24 is defined between rotor 18 and stator 16 and magnetic fluid 26 such as ferro fluid material including a colloidal suspension of ferrite particles in a carrier fluid is attracted to permanent magnets 22 and forms a magnetic fluid bearing between rotor 18 and stator 16. As can be appreciated, magnetic fluid 26 readily adheres to rotor 18 in the vicinity of permanent magents 22 to readily provide a fluid bearing between rotor 18 and stator 16. Rotor 18 has a spherical outer surface 28 as illustrated in FIG. 2 and stator 16 has a corresponding spherical surface 30 as illustrated in FIG. 2. Permanent magnets 22 are spaced about 2 circumferences of rotor 18 and are equally spaced from a center point or position 32 to provide bearing stiffness in both the radial and axial directions. As can be seen, the induction motor mechanization aids in aligning rotor 18 to the desired spin axis and causes it to rotate at the speed desired by the input frequency and the number of poles selected and associated with the particular induction motor design.

Figure 3:
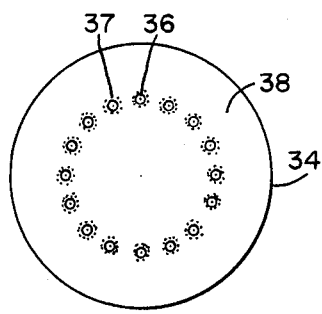
FIG. 3 is a bottom view of the caging plate and illustrating the permanent magnets and the magnetic fluid attracted thereby.

A caging plate 34 is provided for the gyro and includes a plurality of permanent magnet 36 (see FIG. 3) imbedded in a surface thereof with magnetic material attracted by the magnets and forming a fluid bearing between an under surface 38 of caging plate 34 and an upper surface 40 of rotor 18. Actuating means 42 is provided for actuating caging plate 34 away from rotor 18 as rotor 18 is being rotated up to speed.

In operation, when it is desired to place the gyro in operation, power supply 12 is connected to windings 15 of the induction motor and the induction motor mechanism including permanent magnets 22 and the windings of the induction motor aid in aligning rotor 18 to the designated spin axis and causes the rotor to rotate at a speed determined by the input frequency and the number of permanent magnet poles associated with the induction motor. The two rows of permanent magnets 22 which are located at discrete points around the circumference of rotor 18 provide bearing stiffness in both the radial and axial directions for rotor 18. The magnetic fluid 26 adheres to the permanent magnets 22 and provides a fluid bearing between rotor 18 and stator 16. This fluid bearing eliminates the friction associated with the conventional ball bearing gyro and it also offers an improvement over hydrostatic air bearings in that no continuous supply source is required to keep the rotor levitated. As previously pointed out, permanent magnets 22 serve as the armature and are an integral part of the induction motor. Also, the magnetic fluid bearing between stator 16 and rotor 18 improves the efficiency of the induction motor by reducing the heating effect since the air gap normally associated with an induction motor is replaced with the magnetic fluid 26. That is, the air gap between the armature which is the permanent magnets and the coils for the induction motor is substantially eliminated. Also, as rotor 18 is being brought up to speed, magnetic fluid 37 between surfaces 38 and 40 provides a fluid bearing between caging plate 34 and the upper surface of rotor 18. This bearing is maintained during initial spin-up of rotor 18. Upon reaching synchronous speed, caging plate 34 is retracted by actuating means 42 to allow the system to operate as a free gyro. Since caging plate 34 and rotor 18 never actually make physical contact, uncaging kick is virtually eliminated.

We claim:

1. A magnetic fluid gyro bearing and caging mechanism comprising a rotor and a stator member, said rotor and said stator member having corresponding spherical surfaces with a gap defined between the spherical surfaces, said rotor having a plurality of permanent magnets mounted in the surface thereof about two circumferential positions of the rotor and equally spaced about a central portion thereof, said stator having winding means mounted therein, a power supply connected to said winding means, said permanent magnets in said rotor providing an armature means for defining with said winding means a motor, and magnetic fluid means provided at each of said permanent magnets and being attracted to the permanent magnet to provide a fluid bearing between the rotor and stator, whereby when said winding means is energized, said rotor will be rotated up to speed and said magnetic fluid at said permanent magnets will provide bearing stiffness in both radial and axial directions for said rotor.

2. A magnetic fluid gyro bearing and caging mechanism as set forth in claim 1, wherein said rotor has an end surface that is flat and wherein a caging plate that has a flat surface is mounted adjacent said flat end surface, said flat surface of said caging plate having permanent magnets mounted therein and magnetic fluid at said magnets of said caging plate and providing a fluid bearing between said caging plate and said end surface of said rotor, to prevent uncaging kick when the caging plate is moved away from said rotor.

* * * * *